United States Patent
De Roos et al.

(10) Patent No.: US 6,325,859 B1
(45) Date of Patent: Dec. 4, 2001

(54) PROCESS FOR PREPARING BEADS AS FOOD OR TOBACCO ADDITIVE

(75) Inventors: Kris Bart De Roos, Wetzikon; Markus Wetli, Forch, both of (CH)

(73) Assignee: Givaudan Roure (International) SA, Vernier-Geneve (CH)

( * ) Notice: Subject to any disclaimer, the term of this patent is extended or adjusted under 35 U.S.C. 154(b) by 0 days.

(21) Appl. No.: 09/269,840

(22) PCT Filed: Oct. 8, 1997

(86) PCT No.: PCT/EP97/05516

§ 371 Date: Jun. 1, 1999

§ 102(e) Date: Jun. 1, 1999

(87) PCT Pub. No.: WO98/15191

PCT Pub. Date: Apr. 16, 1998

(30) Foreign Application Priority Data

Oct. 9, 1996 (EP) .................................................. 96202822

(51) Int. Cl.⁷ .................................................. A24B 15/30
(52) U.S. Cl. .......................... 131/276; 131/274; 131/275; 131/347; 426/89; 426/97; 426/98; 426/138; 426/277; 426/573; 426/534; 426/578; 426/276; 426/294; 426/471
(58) Field of Search .................................... 131/274, 275, 131/276, 347; 426/573, 277, 578, 534, 89, 97, 98, 138, 276, 294, 471

(56) References Cited

U.S. PATENT DOCUMENTS

| | | | |
|---|---|---|---|
| 2,800,457 | * | 7/1957 | Green et al. . |
| 4,117,172 | * | 9/1978 | Bradshaw et al. . |
| 4,389,419 | * | 6/1983 | Lim et al. . |
| 4,507,327 | | 3/1985 | Ueda ..................................... 426/276 |
| 4,702,921 | | 10/1987 | Ueda ..................................... 426/48 |
| 5,221,502 | * | 6/1993 | Washington . |
| 5,456,937 | * | 10/1995 | Chalupa . |
| 5,536,519 | | 7/1996 | Graf et al. ........................... 426/534 |

FOREIGN PATENT DOCUMENTS

| | | | |
|---|---|---|---|
| 0 221 850 | | 5/1987 | (EP) . |
| 0 242 135 | | 7/1990 | (EP) .............................. B01J/13/02 |
| 0 391 803 | | 10/1990 | (EP) . |
| 0 437 360 | | 7/1991 | (EP) . |
| 464324 | * | 1/1992 | (EP) . |
| 0 464 324 | | 1/1992 | (EP) . |
| 0 490 559 | | 6/1992 | (EP) . |
| 0 528 466 B1 | | 4/1995 | (EP) .............................. A23G/3/30 |
| 2 086 835 | | 5/1982 | (GB) . |
| 193650 B | | 7/1985 | (HU) .............................. A23J/3/02 |
| WO 93/19621 | | 10/1993 | (WO) .............................. A23L/1/22 |
| WO 93/19622 | | 10/1993 | (WO) .............................. A23L/1/22 |
| WO 96/28244 | | 9/1996 | (WO) .............................. B01F/17/00 |

OTHER PUBLICATIONS

P. Brodelius and K. Mosbach, Immobilized plant cells, Adv Appl Microbiol, 28, 1–26 (1982).

A.C. Hulst, et al., A new technique for the production of immobilized biocatalyst in large quantitites, Biotechnol Bioeng 27, 870–876 (1985).

A.B. Pepperman, et al., Alginate controlled release formulations of metribuzin, J Controlled Release 17, 105–112 (1991).

H. Prevost, et al., Continuous yoghurt production with *lactobacillus Bulgaricus* and *Streptococcus Thermophilus* entrapped in ca–alginate., Biotechnol Lett 7 (4) 247–252 (1985).

K. Saito, et al., Stability of carthamin in calcium alginate beads, Food Chem 50, 311–312 (1994).

T. Shiotani and T. Yamane, A horizontal packed–bed bioreactor to reduce carbon dioxide gas holdup in the continuous production of ethanol immobilized yeast cells., Eur J Appl Microbiol Biotechnol 13 (2) 96–101 (1981).

H. Tomida, et al., Preparation of theophylline–loaded calcium alginate gel capsules and evaluation of their drug release characteristics, Chem Pharm Bull 41 (12) 2161–2165 (1993).

* cited by examiner

*Primary Examiner*—Michael Colaianni
(74) *Attorney, Agent, or Firm*—Wood, Herron & Evans, LLP

(57) ABSTRACT

A method for preparing beads containing at least one active ingredient, such as a flavor, fragrance, vitamin, and/or coloring material, to food or tobacco products, where the active ingredient is released at a controlled rate. Discrete droplets of the active ingredient and an acid polysaccharide are formed in an aqueous medium, then the droplets are converted to water insoluble gel beads by introducing the droplets into a solution containing multivalent cations, thereby building a suspension of gel beads. The beads may then be added to the food or tobacco product in an effective amount to flavor, perfume, vitamize, and/or color the product. The beads are heat and mechanically stable.

44 Claims, No Drawings

PROCESS FOR PREPARING BEADS AS FOOD OR TOBACCO ADDITIVE

This application claims priority under 35 U.S.C. 371 from PCT International Application No. PCT/EP97/05516 filed on Oct. 8, 1997, which in turn was based on EP application 96202822.1 filed on Oct. 9, 1996.

FIELD OF THE INVENTION

This invention is related to compositions encapsulating food or tobacco additives and to methods for forming the compositions.

BACKGROUND OF THE INVENTION

The present invention relates to a process for preparing beads as food or tobacco additive containing at least one active ingredient, to methods of use of the beads and to the beads themselves.

A frequent problem associated with the application of flavor systems in the preparation of food or tobacco products is the loss of flavor by volatilization or chemical decomposition. The harsh environment of some food processes like baking, extruding, retorting and deep firing, to name a few, create unique problems for the survival of flavors in finished food products. The loss of flavor usually results in flavor profile distortion or even in complete loss of flavor. Therefore, food scientists and application specialists are continuously searching for methods to protect flavors against volatilization and decomposition during processing.

Another category of flavor application problems results from differences in the interaction between the flavor compounds and the product base. These differences in the flavor-matrix interactions result also in flavor distortion due to the different rates of flavor release during consumption of the product. Typical examples of this type of flavor application problems are the change of flavor character and strength in chewing gum during mastication and the flavor imbalance observed when applying standard flavors to low fat products.

One of the preferred methods to control flavor retention and release is encapsulation. A considerable amount of effort has been devoted for many years to provide solid particulate flavoring materials in which a flavor is contained in the particulate matrix. Various attempts have been made to fix the flavors in many different types of organic matrices to provide stable free-flowing powders of particles which contain the flavor for flavor release when incorporated in foods. Several principle technologies have been proposed for the preparation of solid particulate flavoring materials.

The first category of encapsulated flavors consists of water-soluble particles containing a dispersion of flavor oil. A number of water-soluble carrier materials are employed in the production of this type of encapsulated flavors, such as sugars, modified starches and gums. The industry commonly utilizes spray drying, extrusion and fluidized bed coating to produce the particles. Flavors encapsulated in a water-soluble matrix can be used for controlling flavor delivery and improving flavor stability in dry products such as chewing gum, pressed tablets and dry mixes for the preparation of instant soups, beverages, sauces and desserts. However, this type of encapsulation is unsuitable for improving flavor performance in products that contain water because of dissolution of the particulate flavoring materials. Since in the preparation of most foods, water is involved at any stage of the processing, encapsulation in water-soluble matrices has limited applicability for improving flavor stability or for controlling flavor retention and release.

To overcome the problem of dissolution of the capsule matrix during processing in moist environment, fat encapsulation is sometimes being used (second category). However, the use of fat encapsulated flavors is limited to food products that are processed at relatively low temperatures, because at temperatures above the melting point of the fat much of the effectiveness of the encapsulation is lost. In practice, this means that fat encapsulation can not effectively be used for controlled flavor delivery in products that are heated above 80° C. which comprises the majority of products that is boiled, baked, roasted, (deep) fried or extruded.

The third category of encapsulated flavors consists of particles that are water-insoluble and heat-stable. The methods currently being used to prepare such particles are micro-encapsulation by coacervation and encapsulation in microorganisms.

The encapsulation of flavor oils in heat-stable water-insoluble coacervation microcapsules is described in the patent applications WO 93/19621 and WO 93/19622. The encapsulation of flavor oils in microorganisms is described in European patent application 242,135; the application of microbial cells for controlled flavor release from chewing gum is described in European patent application 528 466.

Both microbial cells and coacervation microcapsules are able to survive food processes like baking, extruding, retorting and deep frying. The major risk for this type of capsules is that they are ruptured during the process as a consequence of the shear forces applied during mixing, grinding or other high-shear processes to which the product is subjected during its production. Therefore, it would be advantageous to have microencapsulated flavors that are less sensitive to shear.

Other potentially interesting materials for the preparation of heat stable, water-insoluble flavor microparticles are salts of anionic polysaccharides such as the calcium salts of alginic acid, pectin and gellan gum. Calcium alginate, in particular, has found useful application as a water-insoluble matrix for the encapsulation of microbial cells (T. Shiotani and T. Yamane, Eur. J. Appl. Microbiol. Biotechnol. 13 (2) 96–101 [1981]; H. C. Provost, Divies and T. Rousseau, Biotechnol. Lett. 7 (4) 247–52 [19851]), enzymes (P. Brodelius and K. Mosbach, Adv. Appl. Microbiol., 28,1 [1982]), drugs (H. Tomida, C. Mizuo, C. Nakamura and S. Kiryu, Chem. Pharm. Bull. 41 (12) 2161–2165 [1993]), vitamins (U.S. Pat. No. 4,389,419), colorings (K. Saito, T. Mori and K. -I. Miyamoto, Food Chem. 50, 311–312 [1994]), foods and food ingedients (U.S. Pat. Nos. 4,507,327; 4,702,921; 5,456,937), cosmetics (European patent application 391, 803), and herbicides (A.B. Pepperman, J. C. W. Kuan and McCombs, J. Controlled Release 17, 105 [1991]). However, for the encapsulation of flavors, calcium alginate or other heat stable polysaccharides have hardly been used. This is not surprising in view of the poor barrier properties of these gels for flavor compounds.

The encapsulation of flavors in aqueous gellan gum gel beads has been described in U.S. Pat. No. 5,456,937. The flavors were encapsulated to provide a product for direct incorporation into dry mixes and juices were prepared therewith without the objective of controlling flavor release.

The use of alginate for controlled flavor delivery is described in European patent application 221,850. This describes the use of calcium alginate for the controlled delivery of water-insoluble flavors from chewing gum. The process for encapsulation involves separation of the alginate matrix from a large excess of water followed by air drying.

Therefore, this process is not suitable for encapsulation of water-soluble and volatile flavors, because these compounds either remain in the aqueous phase or volatilize during drying. Moreover, the approach does not allow control of flavor release by variation of particle size, porosity and flavor solvent composition.

While the above methods for the preparation for heat-stable, water-insoluble capsules allows improvement of flavor retention under harsh conditions, there are restrictions that limit the wide use of these technologies. For example, the existing methods do not allow the encapsulation of water-soluble and volatile flavors with high efficiency. With the available methods, these flavor components are either lost with removal of the water phase (water soluble compounds) or during the drying step (volatile compounds). Moreover, these methods, in particular, coacervation and absorption into microorganisms, are not suitable for encapsulating solid flavoring materials. And finally, these capsules can not withstand high shear conditions which is often required to reduce the risk of premature release by capsule breakage.

In the copending European patent application number 96 20 2823 a method for the production and use of flavors and other active ingredients encapsulated in dry water-insoluble, heat stable gel beads have been described. However, use of this method requires that the active ingredient is oil soluble. It would be advantageous to have also an encapsulation method that allows the encapsulation of oil insoluble active ingredients, especially of oil insoluble flavors, either as single ingredient or in combination, e.g. with vegetable oil, an emulsifier, extender, filler material or adsorbent, providing beads as food or tobacco additive which beads improve retention and stability of the active ingredients during processing and storage without adversely affecting their release during consumption of the food or tobacco product. An object of the invention is to fulfill this demand.

SUMMARY OF THE INVENTION

The demand is fulfilled by beads consisting of a matrix of a reticulated, multivalent cation containing acid polysaccharide and at least one oil insoluble liquid active ingredient and/or one oil insoluble solid active ingredient filling at least partly the voids built by the acid polysaccharide. The active ingredient advantageously is at least one compound of the group consisting of flavors, fragrances, vitamins or coloring materials. Especially the active ingredient is a liquid and/or solid flavor, in particular a flavor oil, or a flavor dissolved in oil. Said multivalent cation containing acid polysaccharide is preferably an alginate, especially calcium algenate. The acid polysaccharide may also be a pectin, especially a low ester pectin or gellan gum. The beads are heat-stable and the active ingredient is either being sustainedly released into the surrounding product matrix during storage prior to consumption or during consumption by compression or rupturing (food) or by destruction of the polysaccharide matrix by burning (tobacco), as is the object of the invention. The beads are also mechanically stable having a diameter of about 10 - about 5000 $\mu$m, preferably of 100–2000 $\mu$m, specifically of 400–1500 $\mu$m.

The beads can be prepared by the following process:

A process for preparing beads as food or tobacco additive containing at least one active ingredient which is released at a controlled rate. The process forms a system of a solution, dispersion, or emulsion of either a liquid or solid active ingredient in an aqueous solution of an acid polysaccharide, especially in the form of an alkali metal salt, an emulsifier, and optionally one or more other water soluble or water dispersible substances. Discrete droplets of the system are then formed. The droplets are converted to water-insoluble gel beads by introducing the droplets in an aqueous or alcoholic solution containing multivalent cations, thereby building a suspension. Optionally, the gel beads may be isolated from the suspension and, further, the isolated beads may optionally be dried.

In the process the active ingredient may be at least one compound of the group consisting of flavors, fragrances, vitamins and/or coloring materials. The active ingredient is a liquid and/or solid flavor, in particular a flavor oil, or a flavor dissolved in oil. Said acid polysaccharide, especially in the form of an alkali metal salt, is preferably an alginate, especially sodium alginate. The acid polysaccharide may also be a pectin, especially a low ester pectin, specifically with a degree of esterification of less than 5% by weight. The polysaccharide may also be gellan gum. The emulsifier may be a modified starch, especially an octenyl succinated starch, or a protein. The water-soluble substance may be a polysaccharide. Preferably, the polysaccharide is at least one of the group consisting of modified cellulose, especially methyl or ethyl cellulose, locust bean gum, dextran, gum arabic and konjac. The water-dispersible substance may be an adsorbent, especially silicon dioxide. The multivalent ions may be ions out of the group consisting of calcium, strontium, barium, iron, silver, aluminium, manganese, copper and zinc, especially calcium ions. Said forming of discrete droplets may be generated by a spraying method known per se, especially by pouring the system on a rotating disk, or by extruding or pumping said system through an orifice or needle at a rate slow enough to prevent the formation of a jet, or by building a jet of said system and breaking up said jet by means of a resonance techniques known per se, e.g. by vibration or pulsation. The gel beads may be isolated from the suspension by filtration or centrifugation, thereby yielding moist beads, which moist beads may be dried, especially in an oven or fluid bed dryer. Preferably the moist beads are dried, in the presence of an anti-caking agent, especially in the presence of maltodextrine or silicon dioxide.

The beads which can be prepared by the afore described process according to the invention are used in a method for flavoring, perfuming, vitaminizing or coloring food, comprising adding the beads to the food in an effective amount. Addition of the beads to the food can be performed during an extruding step of the food product or by coating the food with said beads or even prior to drying, frying, baking, cooking or boiling the food because of their mechanically stability. Adding flavor containing beads to no-fat or low-fat dry mixes, especially to low-fat dry mixtures, which are used for the production of flour-based food are of specific interest and therefore this method is one of the preferred ones. Further preferred is the addition of the beads as described to a no- or low-fat version of a regular food product.

A very favorable method of use of the beads afore described or produced by the afore described process is the method for flavoring and/or perfuming tobacco or a product containing tobacco comprising adding beads containing at least one flavor and/or a fragrance, especially adding those beads prepared by the afore described process, to the tobacco or the tobacco product in an effective amount. The product containing tobacco is preferably a cigarette.

DETAILED DESCRIPTION

The invention is now further described in detail.

The present invention provides a method for encapsulating flavors, fragrances, vitamins, colorings or other active ingredients into a water insoluble, heat stable polysaccharide matrix in such a way that the performance of the encapsulated ingredient during its following use is improved by reducing the risk of active ingredient loss by volatilization or chemical decomposition during processing, especially heat processing, and/or by enhancing or modifying its release during consumption of the food or the tobacco or tobacco product.

The invention is directed to a method for encapsulating flavors and/or other ingredients in microparticles for optimum performance in foods and tobacco. More particularly, it is directed to a method of producing edible microparticles comprising a matrix of essentially water-insoluble, heat stable, and shape-retaining polysaccharide gel held together by salt bridges. In the preferred embodiment of the invention, the process consists of the following steps:

Production of a suspension or slurry of gel beads, in particular, gel beads consisting of a multivalent cation containing acid polysaccharide, containing a water-insoluble or poorly water-soluble flavor or flavor dissolved in water-insoluble solvent. The resulting slurry can be stored and used as such or, if desired, followed by:

separation of the excess of water from the beads by filtration or centrifugation, and optionally, dehydration by oven or fluid bed drying.

In this application beads or microparticles are defined as solid particles with a homogeneous composition and texture from inside to outside in which the active ingredients in the form of droplets or particles are uniformly distributed. Capsules, on the other hand, are defined as particles consisting of a liquid or solid core of the active ingredient surrounded by a shell.

The invention is explained in the following description specifically relative to a flavorant. But it is herewith emphasized that instead of a flavor any other active ingredient of the above mentioned kind can be applied and that instead of food tobacco or a tobacco product may be applied.

The production of the flavor microparticles starts with the preparation of an emulsion consisting of a dispersed phase of solid flavoring or liquid flavor oil, or a combination of both in an aqueous solution of an alkali metal alginate. Optionally, an emulsifier, extender, filler material or adsorbent may be added at this stage.

Subsequently, the emulsion is dripped or sprayed into an aqueous or alcoholic solution of multivalent cations, especially calcium ions, to convert the droplets into shape retaining, water-insoluble gel microparticles. The gel particles can be isolated from the resulting suspension by filtration or centrifugation. The resulting moist (wet) flavor microbeads may be used as such, or may be mixed or coated with an anti-caking agent to obtain a free flowing powder. The free-flowing moist flavor microbeads thus produced are mechanically stable.

The microparticles may also be dehydrated to complete dryness, e.g., by oven or fluid bed drying. This is only useful if the drying costs and the flavor losses during drying are more than compensated for by a higher performance of the encapsulated flavor in the final application. This is often the case if non-volatile or poorly volatile flavors are encapsulated.

The present invention provides a cost-effective process for encapsulation of flavorings of different consistency and volatility, either as such or as solutions in oil or solid fat. Further, the process allows manipulation of flavor retention and release by use of filler materials and/or adsorbents. Also, the present invention provides a process for preparing colored particles by the use of a coloring agent as an active ingredient in the above described process.

The present invention provides microparticles with a unique combination of desirable properties. The particles can have different shaping varying from round beads to long, fibers and may contain different concentrations of flavor oils and/or solid flavor materials, varying from less than 1 to more than 80% by weight. The particles obtained by the process of this invention can much better withstand the harsh conditions during food processing than most other flavor particles. For example, the gel beads are heat and freeze stable both in dry and moist environment. Moreover, they can withstand shear conditions due to their solid texture. For all these reasons, the microbeads are particularly suited for use in products that are subjected to high shear and heat stress during their production.

In the preferred embodiment of the invention, an alkali metal alginate, especially sodium alginate, is dissolved in water to produce a solution containing between about 1 and 10% by weight of the alginate. Concentrations of alginate below about 0.5% by weight are increasingly ineffective in producing defect-free microbeads. Alginate concentrations above 10% by weight, although desirable for reasons of better functionality, are often too viscous to allow formation of small beads of uniform size. Instead of alkali metal alginate, pectin or gellan gum may also be used in this process.

Alginates are linear copolymers of a-L-guiuronate (G) and b-D-mannuronate (M). The alginate chain may be regarded as a block copolymer consisting of "G-blocks" (homopolymeric regions of guluronate residues), "M-blocks" (homopolymeric regions of mannuronate residues) and "MG blocks" (copolymeric regions of a random-like alternating sequence of M and G) of varying length. Besides being heterogeneous with respect to the chemical composition, alginates have quite a broad molecular weight distribution. Alginate is a collective term for a family of polymers. Their properties depend on their block structure and molecular mass.

Above a certain critical molecular mass the properties of the alginates are mainly governed by the monomeric composition and block structure. In general, an increase in the content of guluronate gives mechanically stronger gels with enhanced stability in the presence of non-gelling/anti-gelling ions (e.g. $Na^+$, $Mg^{2+}$) and calcium sequestering agents. Gels with high guluronate content exhibit high porosity and low shrinkage during gel formation. At high content of mannuronate, the gels become softer and more elastic; they shrink more during gel formation with concomitant reduction of porosity. For the encapsulation of flavors, all types of alginates can be used but those with a mannuronate content higher than 40% are generally preferred because it turned out that they are mainly more elastic and less porous.

Instead of sodium alginate, the structurally related pectin may be used for the production of water insoluble, heat stable gel beads. Pectin is a hydrocolloid consisting of polygalacturonic acid of which the carboxylic acid groups are partly esterified with methanol. For high heat stability, the use of a pectin with a low degree of esterification, typically less than 5% by weight is preferred.

Instead of sodium alginate and low ester pectin gellan gum may also be used. Gellan gum is a high-molecularweight heteropolysaccharide consisting of a linear tetrasaccharide repeat structure comprising 1,3-β-D-glucose, 1,4-β-D-glucuronic acid, 1,4-β-D-glucose and 1,4-α-L-rhamnose. It forms gels with several counter ions of which the divalent ions, such as calcium and magnesium, give maximum gel hardness. Gels formed in the presence of calcium ion concentrations higher than 10 mM are heat-stable under normal food processing conditions.

The relatively large pore size of the heat-stable polysaccharide gel beads restricts the capability of gels to act as a barrier for small molecules of the active ingredients such as flavor compounds, vitamins, etc. Nevertheless, the gel beads may sustain the release of molecules over a more or less prolonged period of time depending on the barriers within the gel. If for example, the gel contains other (macro-) molecules, the effective porosity will decrease and the sustained release will be at a lower rate or even negligible. For this reason, it is sometimes advantageous to add a filler material such as maltodextrin, native starch or silicon dioxide to the alginate solution. Other suitable filler materials include water soluble polysaccharides such as, for example, dextrins, dextran, locust bean gum, gum arabic and methyl cellulose, ethyl cellusose, hydroxypropyl cellulose and other water-soluble macromolecules, such as gelatine and other proteins.

In addition to filler materials, emulsifiers, such as octenyl succinated starch and mono- and diglycerides, or mixtures of mono- and diglycerides, may be added to the solution of the acid polysaccharide. These emulsifiers help to obtain an oil-in-water emulsion of high stability which is a prerequisite for the formation of beads of constant composition and size.

Next, the flavoring to be incorporated into the gel beads, either neat or as a solution in a water-insoluble flavor solvent, is added to the aqueous alginate solution, typically on the order of 2–25% by weight. The flavor compounds should preferably be poorly water-soluble to prevent flavor leakage from the alginate beads in the aqueous environment of the slurry during production and storage. Among the flavor solvents useful in the practice of the invention are vegetable oils, solid fats of different melting point and mono- or diglycerides. For application in low and no fat products a lipophilic fat replacer, for example, a sucrose polyester such as Olestra® of Procter & Gamble, may also be used. At this stage, also water-soluble polysaccharides, like dextran or gum arabic, or water-insoluble flavor carriers like silicon dioxide may be added as well as coloring materials and non-volatile flavor ingredients, such as aspartame or capsaicin.

The resulting two or three phase system is subjected to rapid stirring to induce emulsification of the oil phase in the aqueous phase.

Homogenizers or other high shear mixing apparatus are useful for this step. Preferably, the resulting particle or oil droplet size in the emulsion is in the 1–10 micrometer range to ensure good stability of the suspension or emulsion during at least the period of bead formation (which may be up to a few hours). After formation of the emulsion and/or suspension, the gel particles are being prepared using one of the following methods.

One of the preferred methods of gel bead production consists of generating droplets by spraying using a nozzle or disk and collecting the droplets, while substantially spherical, in a multivalent cation containing solution, e.g. an aqueous or alcoholic solution of calcium chloride. The droplets are of a size preferably within the range of about 10 to about 5000 micrometers, more preferably 100–2000 micrometers, specifically 400–1500 micrometers. As the droplets enter the solution, the hydrogen and alkali metal counter-ions of the acid polysaccharide are exchanged by calcium ions, resulting in instantaneous gelation of the droplets through the formation of multiple salt bridges between the acid polysaccharides.

Another method of droplet generation consists of extruding or pumping the emulsion through a needle or orifice at a speed slow enough to prevent the formation of a Jet. This method provides beads of very uniform size but the production capacity is low. Much higher capacity is achieved by making use of resonance techniques, such as vibration and resonation, which consist of breaking up a jet of the emulsion in uniform droplets by means of resonation (see, for example, A. C. Hulst, J. Tramper, K. van't Riet and J. M. M. Westerbeek, Biotechnol. Bioeng. 27, 870–876 [1985]). Therefore, the latter method is preferred for the large-scale production of gel beads.

Still another method for the production of gel microparticles consists of preparing a gel using mixtures consisting of sodium salt of an acid polysaccharide and one other gel forming polymer such as agar, and to break the gel into small particles by shear. Subsequently, a concentrated solution of calcium chloride is added to convert the water soluble salt of the acid polysaccharide into a water insoluble calcium salt in order to obtain microparticles of high heat stability. The particles obtained by this method have an irregular shape which might be an advantage in some applications. In principle, particles of any shape can be used for the flavor encapsulation provided that the dimensions are not that extreme that the flavor retention and release are adversely affected.

Calcium ions in the concentration range of 1–10% by weight are the preferred multivalent cations for gelation of alkali metal alginate, pectin and gellan gum because of their high effectiveness, low costs and low toxicity. In principle, other metal ions such as strontium, barium, iron, silver, aluminum, manganese, copper or zinc ions may also be used. When the calcium chloride meets the drops of the solution of the acid polysaccharide, a skin of an insoluble calcium containing polysaccharide gel forms at once on the outside. Thereafter, calcium ions diffuse slowly into the drops and so a reasonable time is necessary for full conversion to solid gelled particles. For drops of a diameter of 10–5000 micrometers, and a calcium chloride solution of 1–5% by weight, the optimum contact time varies from 5 to 500 minutes. However, if the flavor contains water-soluble constituents, it might be advantageous to isolate the particles already after a short period from the calcium bath in order to avoid leakage of these water soluble compounds from the microparticles.

When calcium ions diffuse into the solution of the acid polysaccharide, the rapid ion-binding and network formation produces an inwardly moving gelling zone. The acid polysaccharide itself will also diffuse towards this gelling zone, leading to a depletion of polysacchride in the center. A gel bead with such an inhomogeneous distribution of polysaccharide may be advantageous for certain flavor applications because of the higher gel strength in the outer zone. In fact, in this way capsules may be formed consisting of an alginate shell around a core of solid or liquid flavor. In general, low molecular mass alginate, low concentration of gelling ions and absence of non-gelling ions give the highest inhomogeneity, whereas a high molecular weight polysaccharide, and a high concentration of non-gelling ions all give increased homogeneity.

The preferred solvents for the solution of multivalent cations are water and/or a low molecular weight alcohol such as ethanol or isopropyl alcohol. In general, water is the preferred solvent, if the encapsulated flavor is used in slurry form. To avoid microbial spoilage during storage, preservatives such as mixture of sodium benzoate and citric acid are added to the slurry.

The microparticles prepared by one of the above methods can be isolated from the slurry by filtration or centrifugation. To obtain a free flowing solid material, starch, silicon dioxide (e.g. Syloid®), maltodextrin or any other water binding material can be added after isolation. Since different combinations of flavor (solvent) and acid polysaccharide cause different shrinkage during drying, the volume of flavor oil in the original emulsion should be optimized for different polysaccharides in order to obtain dry particles with little surface oil and a minimum tendency to stick together.

A variety of flavors and/or flavor ingredients may be encapsulated in the gel microparticles. The flavors include flavor compounds like menthol, and complex mixtures like extracts, essential oils, oleoresins or reconstituted natural, nature-identical or artificial flavors. Natural extracts, essential oils and oleoresins include fruit essences, vanilla extract, capsicum oleoresin, pepper oleoresin, cinnamon oil, oil of winter green, peppermint oil, bay oil, thyme oil, spearmint oil, cassia oil, citrus oils, and the like. Reconstituted natural, nature-identical and artificial flavors include apple, cherry, strawberry, peach as well as meat, cheese, tomato and butter flavors. These flavorings may be used individually or in a mixture as is well known in the art.

Hereafter same applications according to the invention are described.

The heat stable, sustained-release polysaccharide gel beads as obtained by the processes described in this invention may be employed to improve flavor impact in a wide variety of food applications. For instance, encapsulation in a multivalent cation containing acid polysaccharide matrix may be used to protect the flavor against volatilization and chemical decomposition during heat processing. The term heat-stable as used herein means protected against deteriorating effects of heat under dry and/or moist conditions. The heat stable polysaccharide microparticles are particularly suited for improving flavor retention in (semi-)solid foods during boiling, cooking, baking, frying, roasting, drying, extrusion, and microwave heating. Moreover, they are able to protect flavors in liquid products like soups and sauces against chemical decomposition or volatilization during retorting, boiling, pasteurization or sterilization.

The polysaccharide microparticles obtained by filtration or centrifugation are preferred over those in suspension form for use in products that require heat processing to produce the finished product. In such applications, a lower water content in the microenvironment of the beads is essential for high retention of the encapsulated flavor. Study of the relationship between flavor losses during heat processing and the steam volatility of the flavor constituents strongly indicates that steam distillation from the microenvironment of the moist flavor beads is a major cause of flavor loss from the moist gel microparticles. Therefore, maximum effect from the use of moist gel microparticles is obtained if the particles can be incorporated in the dry mix long before the preparation of the dough or batter. In that way the moisture from the beads will migrate to the surrounding dry mix ingredients resulting in almost dry gel microparticles.

One of the major advantages of use of flavor encapsulation in polysaccharide gel microparticles is that the encapsulation does not adversely effect flavor release during food consumption. One of the reasons for this is that the microparticles provide sustained release of the flavor to the product during storage and prior to consumption. Another reason is that the flavor release from the beads is as good as or even better than the release from the food matrix in which the unencapsulated flavor constituents are entrapped. The release can be influenced by varying the flavor solvent, the filler materials, the type of acid polysaccharide used and the conditions used for formation of the gel particles. For example, the time-intensity profile of flavor release can be influenced by varying the conditions of the gelation with calcium, e.g., by changing the calcium ion concentrations or the duration of gel formation.

Because of their ability to influence flavor release, the water insoluble polysaccharide gel particles are also particularly suited for use in low fat products such as low fat ice cream. An example of poor taste perception in low fat products is vanilla ice cream. The reduction of the fat content in ice cream results in distortion of the vanilla flavor profile due to the effect of the fat on flavor release. Moreover, it results in poor flavor stability (U.S. Pat. No. 5,536,519). Encapsulation in a water insoluble, fat or oil containing polysaccharide gel helps to improve flavor performance by the creation of a microenvironment surrounding the flavor that mimics the original full fat base. Best results are obtained with flavor solvents that are solid at low temperature but fluid at the temperature in the mouth during the consumption of the ice cream. The advantage of encapsulation in a polysaccharide matrix over fat encapsulation is that free flowing flavor microparticles can be prepared from oils or fats of low melting point without the need of low temperature storage.

Another area where alginate encapsulated flavors according to the invention find specific use is in tobacco or tobacco products. Especially flavored cigarettes such as menthol and kretek cigarettes often suffer from high flavor loss prior to smoking due to evaporation of the volatile flavor constituents. These losses are effectively reduced by encapsulating the flavor in a dense matrix, especially an alginate matrix in form of the afore described microparticles, which optionally contain additional fillers to further reduce the permeability of the matrix. Surprisingly, the encapsulation does not adversely affect the flavor release during smoking because the carbohydrate matrix is destroyed by burning thus removing the main barrier to flavor release. Use of an alginate matrix for encapsulation has the important advantage of not generating an off-taste when burnt in contrast with the use of protein containing coacervation microcapsules.

The following examples illustrate the practice of this invention and its preferred modes. It will be understood, however, that these examples are not intended to limit the scope of the invention. All mentioned percent values are percent values by weight.

EXAMPLE 1

Sodium alginate (type FD 155, Grindsted; 2.74 g) was dissolved in demineralized water (100 g) with stirring to produce a homogeneous aqueous solution. Capsul (2.00 g) was added and stirring is continued till again a homogeneous phase was obtained. Subsequently, butter flavor (76.9 g), consisting of a solution of 26.5 g flavor in 73.5 g of miglyol, was added to the solution and the resulting two-phase system was homogenized with an Ultra-Turrax apparatus (1 to 4 min). The emulsion was fed through a vibrating needle of 1.22 mm internal diameter disposed about one inch above the lowest point of an eddy generated in a glass beaker by vigorous magnetic stirring of an 1.6% aqueous solution of calcium chloride dihydrate in water. The flow rate through the needle was adjusted to avoid the formation of a jet. The emulsion droplets, upon entering the calcium chloride solution, immediately gelled to yield particles of a diameter of about 800 micrometer. For preservation, sodium benzoate was added to the slurry at 3 g/L and the pH was adjusted to 3.8 by adding citric acid. The resulting slurry was stored at a temperature of 4–8° C.

The product as obtained by this procedure can be used in two different forms: either in the form of a slurry or in the form of free flowing, moist beads as obtainable by filtration or centrifugation. The moisture content of the beads obtained by filtration was approximately 50%, whereas the beads obtained by centrifugation contain about 20% of moisture. To improve the free flowing properties of the latter low-moisture beads, an anti-caking agent, such as corn starch, was sometimes added. The particle size of the moist beads as produced by this method is in the range of 600–1200 mm.

Before doing application tests with the alginate beads, the particle size of the beads was measured in aqueous slurry using a Coulter Counter particle size analyzer. The particle size given in this and all the other Examples is the mean value for the wet beads in aqueous slurry, unless specified otherwise.

EXAMPLE 2

Sodium alginate (type FD 155, Grindsted; 3.51 g) was dissolved with stirring in demineralized water (100 mL) to produce a homogeneous aqueous solution. A peach flavor (35 g, containing 13.4% flavor and 86.6% miglyol) was added and the resulting two-phase mixture was homogenized by vigorous stirring with an Ultra-Turrax apparatus to form a stable oil-in-water emulsion (10 min). The emulsion was fed through a needle of 0.8 mm I.D. into 100 g of a magnetically stirred 25% aqueous solution of calcium chloride contained in 250 mL glass beaker. A stream of air was directed at the exit of the needle to prevent the formation of large droplets. The emulsion droplets, upon entering the calcium chloride solution, immediately gel to yield particles with a diameter of about 1500 micrometer. After completion of the addition, the slurry of beads was allowed to stand for 30 minutes to allow penetration of the calcium ions into the beads. Subsequently, the beads were isolated by filtration with suction to yield moist particles of a water content of about 30%.

EXAMPLE 3

Maltodextrin (Glucidex IT 19, Roquette; 800 g) was dissolved with stirring in 3960 g of demineralized water at 50° C. Subsequently, 40 g of sodium alginate (type Manucol DM, Kelco) was added and the solution was stirred for 5 min with an Ultra-Turrax apparatus and then allowed to stand for 1 hr at 40° C. Dill oil (200 g) was added and the resulting two-phase mixture was homogenized by vigorous stirring for 5 min with an Ultra-Turrax apparatus to form a stable oil-in-water emulsion. The emulsion was then fed through a vibrating manifold (240 Hertz), containing six orifices of 400 mm diameter, into a 6% calcium chloride solution. This takes about 90 minutes. After 10 minutes, the beads were isolated by filtration, washed with water and dried in a fluid bed drier for 30 min at 45° C. to yield 232 g of dry beads with a dill oil content of 40.9% (measured by steam distillation). The particle size distribution of the dry beads is as follows: 60% of 0.4–0.8 mm; 13% of 0.8–1.0 mm and 25%>1.0 mm.

EXAMPLE 4

Sodium alginate (type Manucol LB, Kelco; 640 g) was slowly dissolved with stirring in 7360 g of demineralized water at 50° C. (Ultra-Turrax apparatus) to produce a 8% sodium alginate solution. A solution of 782 g of menthol in 195 g of propylene glycol, homogenized by stirring with the Ultra-Turrax apparatus, was fed through a vibrating manifold (240 Hertz), containing with six orifices of 800 mm diameter, into a 6% calcium chloride solution over a period of 45 min. After 10 minutes, the gel beads were collected by filtration, washed with water and dried in a fluid bed drier for 70 min at 45° C. to yield 1278 g of dry beads of 1–1.25 mm particle size and a menthol content of 32%.

EXAMPLE 5

This example is meant to demonstrate that encapsulation in alginate beads does not necessarily result in a higher flavor retention during baking, if the water content of the beads is high.

A slurry of an alginate encapsulated butter flavor, prepared according to method 1, was evaluated in a hard biscuits against the unencapsulated flavor. The particle size of the beads was between 400 and 1000 mm (mean value: 614 mm). The biscuits were prepared according to the following recipe:

| Ingredients | Group | Quantity (parts) |
| --- | --- | --- |
| Industrial sugar | A | 65.00 |
| Water | A | 70.00 |
| Vegetable fat (Eureka) | A | 40.00 |
| Glucose syrup | A | 10.00 |
| Salt | A | 2.50 |
| Ammonium bicarbonate | A | 1.25 |
| Sodium bicarbonate | A | 1.00 |
| Sodium acid pyrophosphate | A | 0.25 |
| Lecithin | A | 0.50 |
| Biscuit flour (IJsvogel) | B | 300.00 |
| Sodium metabisulfite | B | 4.00 |
| Tastemaker flavor | B | Variable* |
| Total: | | 100.00 + variable |

*The flavor dosage was adjusted to compensate for differences in flavor concentration in the added flavorings.

Mixing procedure and bake conditions:

a. Preheat tne Z-blade mixer until 40° C.

b. Mix all A ingredients for 2 min in the Z-blade mixer c. Add B ingredients and mix for 3 min to a dry dough d. Measure dough temperature. Should be about 30° C.

e. Knead manually till smooth if necessary f. Sheet the dough in steps to 2 mm (25-20-15-10-5-2), fold the dough and repeat sheeting once more g. Cut the sheet (2 mm) into biscuit forms h. Bake the biscuits at 200C for 10–13 min Organoleptic evaluation demonstrated that the flavors of the biscuits with the encapsulated and unencapsulated flavor was very similar. The flavor of the biscuits was evaluated (group of 4 people) on both smell (aroma perception by sniff) and taste (aroma perception by mouth). The organoleptic scores were as follows:

|  | Intensity of butter aroma** by | |
|---|---|---|
|  | Sniff | Mouth |
| Unencapsulated flavor | 7.50 | 6.63 |
| Alginate encapsulated flavor (as suspension) | 6.75 | 6.50 |

**Organoleptic scores:
3 = weak, flavor type difficult to recognize;
4 = weak, but flavor recognizable;
5 = Acceptable flavor strength, slightly too weak;
6 = Optimum flavor strength;
7 = Flavor slightly too strong;
8 = flavor much too strong;
9 = flavor extremely strong; burning sensation The differences in intensity between aroma perception by sniff and by mouth are very small. This indicates that the gel beads provide a sustained release of the encapsulants to the baked product during storage and prior to consumption.

Similar results were obtained with an apple flavor in crackers.

EXAMPLE 6

In order to further investigate the effect of moisture content of the alginate beads on flavor retention, the following products were evaluated in crackers:

a. Apple flavor, 31% in miglyol b. Apple flavor, 22.5% in miglyol, encapsulated in calcium alginate type Protanal LF 20/60 L (Pronova). (calculated as percentage of the flavored dry beads). The beads/capsules were isolated by filtration to yield beads of 49% moisture content. The particle size of the wet beads was 1091 mm (modal value).

c. Same as b, but the encapsulated moist flavor beads were added to dry cracker mix (28.3 g of wet beads per kg of cracker mix), 1 day prior to baking to allow moisture to migrate from beads to flour.

d. Same as b, except for the method of bead isolation which was by centrifugation instead of filtration. The beads that contained 19% of moisture were coated with corn starch (25 g/100 g of moist beads) to improve free-flowing properties. Moisture content of coated beads: 16%.

The crackers were prepared according to the following recipe:

|  | Group | % |
|---|---|---|
| Biscuit flour | A | 53.80 |
| Modified starch (C*top) | A | 3.00 |
| Tetra sodium pyrophosphate | A | 0.10 |
| Sodium bicarbonate | A | 0.20 |
| Dextrose | A | 2.50 |
| Skimmed milk powder | A | 4.00 |
| Salt | A | 1.50 |
| Monosodium glutamate | A | 0.40 |
| Lecithin M30 | A | 0.40 |
| Ammonium bicarbonate | C | 2.00 |
| Biskien soft (fat) | B | 9.00 |
| Sodium metabisulfite (10% in water) | D | 0.10 |

-continued

|  | Group | % |
|---|---|---|
| Water | C | 23.00 |
| Flavor | B | Variable* |
| Total: |  | 100.00 + Variable |

*The flavor dosage was adjusted to compensate for differences in flavor concentration in the added flavorings.

Mixing procedure and bake conditions:

a. Mix the dry A ingredients in the Hobart mixer.

b. Melt the fat and add the flavor to the molten fat.

c. Add the molten fat with flavor to the mix of A ingredients.

d. Prepare solution of C ingredients.

e. Mix slowly the C ingredients with the mix of A+B ingredients in the Hobart bowl (1.30 min).

f. Add the D ingredient and mix slowly for 1 min, then fast till a temperature of 29–30° C. has been achieved.

g. Roll and laminate.

h. Cut the sheet into cracker forms.

i. Bake at 200° C. for 6–8 minutes.

The results of the organoleptic evaluation show that the flavor performance of the encapsulated flavors increases with decrease of moisture content. The results demonstrate also that premixing of wet beads in to a dry bake mix has a positive effect on their performance.

|  | Intensity of aroma** by | |
|---|---|---|
|  | Sniff | Mouth |
| Unencapsulated flavor | 4.50 | 3.88 |
| Encaps. flavor, 49% moisture | 5.38 | 4.50 |
| Idem, premixed into cracker dry mix | 6.63 | 6.88 |
| Encaps. flavor, dry (16% moisture) | 6.75 | 7.00 |

**see Example 5

The results of the organoleptic analysis are in agreement with those of the chemical analysis which shows an increase of flavor retention with a decrease of the moisture content of the beads. The flavor retention was determined as the difference between the flavor concentrations in dough and cracker taking into account the loss of water during baking.

|  | % Retained during baking | | |
|---|---|---|---|
|  |  | Encapsulated flavor | |
| Compound Name | Liquid flavor | 49% $H_2O$ | 16% $H_2O$ |
| Ethyl butyrate | 4.0 | 4.5 | 19.1 |
| tr-2-Hexenal | 5.7 | 8.8 | 24.5 |
| cis-3-Hexenol | 4.3 | 8.2 | 8.0 |
| Hexanol | 5.5 | 6.5 | 14.1 |
| Butyl Butyrate | 5.2 | 12.7 | 33.1 |
| 3-Methylbuthyl Butyrate | 7.2 | 15.7 | 28.7 |
| Linalool | 11.0 | 19.4 | 28.4 |
| Ethyl benzoate | 12.3 | 24.9 | 47.0 |

-continued

| Compound Name | % Retained during baking | | |
|---|---|---|---|
| | Liquid flavor | Encapsulated flavor | |
| | | 49% H$_2$O | 16% H$_2$O |
| Cis-3-hexenyl Butyrate | 13.7 | 47.1 | 32.9 |
| Ethyl octanoate | 15.6 | 26.7 | 29.8 |
| β-Damascone | 47.1 | 54.9 | 65.9 |

EXAMPLE 7

The performance of encapsulated peach flavor prepared by the process described in Example 2 was compared with that of the corresponding unencapsulated liquid flavor in crackers. The amount of flavor used per kg of dough was the same in both cases. This means that loss of volatile and water soluble compounds during filtration has to be taken into account when interpreting the results of the organoleptic evaluation.

In spite of possible flavor losses during filtration, the encapsulated flavor provided much stronger peach flavor to the crackers than the unencapsulated flavor. This has to be attributed to a better retention of the encapsulated flavor during baking (determined as described in Example 6). This holds in particular for the fat soluble, hydrophobic flavor compounds.

| Compound Name | % Retained during baking | |
|---|---|---|
| | Liquid flavor | Encapsulated flavor |
| Cis-5-octenol | 44 | 42 |
| 2-Isopropyl-4-methylthiazole | 6 | 13 |
| Linalool | 10 | 24 |
| Cis-3-hexenyl Butyrate | 10 | 26 |
| Methyl tr-3-Noneoate | 17 | 33 |
| Cis-3-hexenyl 2-Methylbutyrate | 13 | 30 |
| Damascenone | 21 | 58 |

EXAMPLE 8

The performance of an alginate encapsulated dill flavor prepared according to the method of Example 3 was evaluated in crackers using the bake recipe of Example 5. The results of the organoleptic evaluation (5 people) are shown below:

| | Intensity of aroma** by | |
|---|---|---|
| | Sniff | Mouth |
| Dill oil (3.2 g/kg) | 6.50 | 6.70 |
| Encapsulated flavor (7.68 g/kg) | 7.80 | 8.20 |

Chemical analysis confirmed that encapsulation has a positive effect on the flavor retention during baking:

| Compound Name | % Retained during baking | |
|---|---|---|
| | Liquid flavor | Encapsulated flavor |
| α-Pinene | 17.9 | 52.6 |
| α-Phellendrene | 10.9 | 55.8 |
| p-Cymene | 18.7 | 45.7 |
| Limonene | 15.5 | 52.1 |
| Dihydrocarvone (cis) | 39.9 | 70.0 |
| Dihydrocarvone (trans) | 23.5 | 61.0 |
| Carvone | 34.6 | 69.1 |

**see Example 5

What is claimed is:

1. A process for preparing beads as food or tobacco additives containing at least one active ingredient which is released at a controlled rate, said process comprising the steps of:
    first forming discrete droplets of said active ingredient in the form of first droplets or particles and an acid polysaccharide in an aqueous medium, and
    converting said discrete droplets to water-insoluble gel beads by thereafter introducing said discrete droplets into a solution containing multivalent cations thereby building a suspension of gel beads, said beads having a homogeneous composition and texture from inside to outside in which the active ingredient in the form of first droplets or particles is uniformly distributed.

2. The process of claim 1 wherein the active ingredient is selected from the group consisting of a flavor, a fragrance, a vitamin, a coloring material and combinations thereof.

3. The process of claim 2 wherein the flavor is selected from the group consisting of a flavor oil and a flavor dissolved in oil.

4. The process of claim 1 wherein said acid polysaccharide is selected from the group consisting of an alginate, a pectin, and a gellan gum.

5. The process of claim 4 wherein the alginate is sodium alginate.

6. The process of claim 4 wherein the alginate has a mannuronic acid content of at least 40 weight percent.

7. The process of claim 11 further comprising an emulsifier in the aqueous medium.

8. The process of claim 7 wherein the emulsifier is selected from the group consisting of a modified polysaccharide and a protein.

9. The process of claim 1 wherein said aqueous medium is selected from the group consisting of a solution, a dispersion, an emulsion, and combinations thereof.

10. The process of claim 1 wherein said acid polysaccharide is in the form of an alkali metal salt.

11. The process of claim 1 wherein said multivalent cation solution is selected from the group consisting of an aqueous solution and an alcoholic solution.

12. The process of claim 1 wherein the multivalent cations are selected from the group consisting of calcium, strontium, barium, iron, silver, aluminum, manganese, copper, zinc, and combinations thereof.

13. The process of claim 1 wherein the multivalent cations are calcium ions.

14. The process of claim 1 wherein said forming of said discrete droplets is by a method selected from the group consisting of spraying, extruding, resonance dispersing and combinations thereof.

15. The process of claim 1 further comprising at least one water dispersible substance selected from the group consisting of a second polysaccharide, an adsorbent, and combinations thereof to form said discrete droplets.

16. The process of claim 1 further comprising isolating said gel beads from said suspension by a method selected from the group consisting of filtering, centrifuging or combinations thereof to yield moist beads.

17. The process of claim 16 wherein the moist beads are dried.

18. The process of claim 17 wherein the moist beads are dried in an oven.

19. The process of claim 17 wherein the moist beads are dried in a fluid bed dryer.

20. The process of claim 17 wherein the moist beads are dried in the presence of an anti-caking agent selected from the group consisting of starch, maltodextrine, silicon dioxide and combinations thereof.

21. A method for treating food comprising adding beads containing at least one active treating ingredient which is released at a controlled rate, said beads prepared by:

first forming discrete droplets of said active ingredient in the form of first droplets or particles and an acid polysaccharide in aqueous medium, converting said discrete droplets to water-insoluble gel beads by thereafter introducing said discrete droplets into a solution containing multivalent cations thereby building a suspension of gel beads, said beads having a homogeneous composition and texture from inside to outside in which the active ingredient in the form of first droplets or particles is uniformly distributed, and adding said beads to the food in an effective amount.

22. The method of claim 21 wherein said active ingredient is selected from the group consisting of a flavorant, a fragrance, a vitamin, a colorant and combinations thereof.

23. The method of claim 21 wherein said beads are added to a food that is extruded and adding said beads prior to extrusion.

24. The method of claim 21 wherein said beads are added to a food that is extruded and adding said beads during extrusion.

25. The method of claim 21 comprising adding the beads to the food by coating the food with the beads.

26. The method of claim 21 comprising adding the beads to the food prior to further treating the food by a method selected from the group consisting of drying, frying, baking, cooking, boiling and combinations thereof.

27. The method claim 21 wherein the food is a low fat dry mix used for producing flour-based food.

28. The method of claim 21 wherein the food is a low-fat food.

29. The method of claim 21 wherein said treating includes flavoring food.

30. A method for treating a tobacco product comprising adding beads containing at least one active ingredient which is released at a controlled rate, said beads prepared by:

first forming discrete droplets of said active ingredient in the form of first droplets or particles and an acid polysaccharide in aqueous medium, and converting said discrete droplets to water-insoluble gel beads by thereafter introducing said discrete droplets into a solution containing multivalent cations thereby building a suspension of gel beads, said beads having a homogeneous composition and texture from inside to outside in which the active ingredient in the form of first droplets or particles is uniformly distributed and, adding said beads to the product in an effective amount.

31. The method of claim 30 wherein the product is a cigarette.

32. A bead comprising a matrix of a reticulated multivalent cation containing acid polysaccharide and at least one active ingredient in the form of droplets or particles, said bead having a homogeneous composition and texture from inside to outside in which the active ingredient in the form of droplets or paticles is uniformly distributed, said droplets or particles of said active ingredient at least partly filling a void built by the acid polysaccharide.

33. The bead of claim 32 wherein the active ingredient is selected from the group consisting of a flavor, a fragrance, a vitamin, a coloring material or combinations thereof.

34. The bead of claim 33 wherein the active ingredient is selected from the group consisting of a flavor oil, a flavor dissolved in oil, and combinations thereof.

35. The bead of claim 32 wherein said multivalent cation containing acid polysaccharide is selected from the group consisting of an alginate, a pectin, a gellan gum and combinations thereof.

36. The bead of claim 32 wherein said bead is heat stable.

37. The bead of claim 32 wherein said active ingredient is sustainedly released.

38. The bead of claim 32 wherein said bead is mechanically stable.

39. The bead of claim 32 wherein said bead has a diameter in the range of about 10–5000 $\mu$m, preferably 100–2000 $\mu$m, and most preferably 400–1500 $\mu$m.

40. The bead of claim 32 wherein said process to produce said bead further comprises adding at least one water dispersible substance to said system.

41. A method for treating a product comprising adding beads containing at least one active ingredient which is released at a controlled rate, said beads prepared by:

first forming discrete droplets of said active ingredient in the form of first droplets or particles and an acid polysaccharide in aqueous medium, and converting said discrete droplets to water-insoluble gel beads by thereafter introducing said discrete droplets into a solution containing multivalent cations thereby building a suspension of gel beads, said beads having a homogeneous composition and texture from inside to outside in which the active ingredient in the form of first droplets or particles is uniformly distributed and adding said beads to the product in an effective amount.

42. The method of claim 41 wherein said product is a food product.

43. The method of claim 41 wherein said product is a tobacco product.

44. The method of claim 41 wherein said active ingredient is selected from the group consisting of a flavor, a fragrance, a vitamin, a coloring material and combination thereof.

* * * * *

UNITED STATES PATENT AND TRADEMARK OFFICE
CERTIFICATE OF CORRECTION

PATENT NO. : 6,325,859 B1  Page 1 of 1
DATED : December 4, 2001
INVENTOR(S) : Kris Bart De Roos et al.

It is certified that error appears in the above-identified patent and that said Letters Patent is hereby corrected as shown below:

Column 16,
Line 43, "11" should be -- 1 --

Signed and Sealed this

Eighteenth Day of June, 2002

Attest:

JAMES E. ROGAN
Attesting Officer   Director of the United States Patent and Trademark Office